(12) United States Patent
Matze et al.

(10) Patent No.: US 7,613,784 B2
(45) Date of Patent: Nov. 3, 2009

(54) SYSTEM AND METHOD FOR SELECTIVELY TRANSFERRING BLOCK DATA OVER A NETWORK

(75) Inventors: John E. G. Matze, Poway, CA (US); Michael H. Reider, Escondido, CA (US)

(73) Assignee: Overland Storage, Inc., San Diego, CA (US)

( * ) Notice: Subject to any disclaimer, the term of this patent is extended or adjusted under 35 U.S.C. 154(b) by 948 days.

(21) Appl. No.: 10/444,680

(22) Filed: May 22, 2003

(65) Prior Publication Data

US 2004/0236841 A1 Nov. 25, 2004

(51) Int. Cl.
*G06F 15/167* (2006.01)

(52) U.S. Cl. .................. 709/212; 709/213; 709/214; 709/215; 709/216; 710/8; 714/15

(58) Field of Classification Search .................. 709/212, 709/215, 216, 213, 214; 710/8; 714/15
See application file for complete search history.

(56) References Cited

U.S. PATENT DOCUMENTS

| | | | |
|---|---|---|---|
| 3,633,169 A | 1/1972 | Bickford et al. | |
| 3,989,899 A | 11/1976 | Norwich | |
| RE31,852 E | 3/1985 | Soderblom | |
| 4,554,418 A | 11/1985 | Toy | |
| 4,621,362 A | 11/1986 | Sy | |
| 4,649,563 A | 3/1987 | Riskin | |
| 4,661,951 A | 4/1987 | Segarra | |
| 4,709,365 A | 11/1987 | Beale et al. | |
| 4,868,832 A | 9/1989 | Marrington et al. | |
| 4,907,150 A | 3/1990 | Arroyo et al. | |
| 4,922,244 A | 5/1990 | Hullett et al. | |
| 5,136,580 A | 8/1992 | Videlock et al. | |
| 5,218,604 A | 6/1993 | Sosnosky | |
| 5,384,566 A | 1/1995 | McCreary et al. | |
| 6,189,001 B1 * | 2/2001 | McGovern et al. | 707/1 |
| 6,543,004 B1 * | 4/2003 | Cagle et al. | 714/15 |
| 6,944,152 B1 * | 9/2005 | Heil | 370/360 |
| 2001/0013102 A1 * | 8/2001 | Tsuchiya et al. | 714/6 |
| 2003/0163610 A1 * | 8/2003 | Stevens | 710/8 |
| 2004/0117410 A1 * | 6/2004 | Dietterich et al. | 707/200 |

* cited by examiner

*Primary Examiner*—Ario Etienne
*Assistant Examiner*—Barbara N Burgess
(74) *Attorney, Agent, or Firm*—Knobbe Martens Olson & Bear LLP

(57) ABSTRACT

A system for sharing block data includes a non-removable device for storing block data (e.g. a hard drive) that is networked with a plurality of computers. Each computer can initiate discovery commands and read/write commands, and transmit these commands over the network to the non-removable storage device. Computer commands are intercepted and processed by a logical algorithm program at the storage device. One function of the logical algorithm program is to instruct each computer to treat the non-removable block storage device as a removable block device. Because the computers treat the storage device as a removable block device, they relinquish control of the device (after use) to other computers on the network. The logical algorithm program also functions to allocate temporary ownership of the block storage device to one of the computers on the network and passes temporary ownership from computer to computer on the network.

10 Claims, 2 Drawing Sheets

SYSTEM AND METHOD FOR SELECTIVELY TRANSFERRING BLOCK DATA OVER A NETWORK

FIELD OF THE INVENTION

The present invention pertains generally to systems and methods for allowing a plurality of computers to access and share a block level input/output (I/O) device. More particularly, the present invention pertains to systems that allow a backup server and an application server to access and share a block level storage device for the purpose of backing up data from the application server. The present invention is particularly, but not exclusively, useful for quickly backing up data from an application server on a primary backup hard drive and a secondary backup tape.

BACKGROUND OF THE INVENTION

Typical computer operating systems (e.g. Windows®) transport data over IP networks using either a file protocol (e.g. common internet file system—abbreviated CIFS) or a block protocol (e.g. internet small computer systems interface—abbreviated iSCSI). A nice feature of the CIFS protocol is that file sharing among multiple computers on a network is supported. However, the CIFS protocol requires a rather large overhead to support data sharing (and other functions). As a consequence, data transfer performance over a network is somewhat poor.

On the other hand, a nice characteristic associated with the block protocol is its relatively low overhead. Indeed, the block protocol is quite efficient and can be used to very quickly transport data over a network. In fact, in most cases the block protocol can be used to achieve line-rate data transfers to and from block storage devices over IP networks. However, heretofore, block storage devices, such as a typical hard drive, could not be easily shared by multiple computers. To the contrary, most operating systems have been written to interact with block storage devices as the exclusive owner, and as such, do not easily relinquish control of a block storage device. For example, operating systems tend to keep large amounts of data in cache when interacting with a non-removable block storage device such as a hard drive, and accordingly, do not give up ownership of the hard drive quickly and easily. On the other hand, when an operating system is interacting with a removable storage device such as a floppy drive or CD ROM, the operating system keeps only small amounts of data in cache, and frequently dumps its cache. As a consequence, the operating system quickly and easily relinquishes control of a floppy or CD ROM drive, for example when a user ejects the removable disk.

One solution that has been suggested to allow non-removable block level storage devices to be shared over a network involves the addition of complex software (and in some cases additional hardware) to each computer on the network to facilitate the transfer of a block storage device between multiple computers. However, a much more practical solution is needed. Specifically, there is a need to develop a block storage device that can be plugged into a pre-existing network to allow block level data to be shared by computers on the network and which is operable with little or no modification to the existing computers on the network.

One application in which the sharing of block level data over a network is particularly useful is data backup. For example, it is typically a prudent business practice to backup an application server on a daily basis, and in some cases, several times a day. Traditionally, data on an application server has been transferred over an IP network to a backup server, where the data is then written to tape. Backup storage on tape has several advantages. Specifically, tape provides good long-term storage, is relatively inexpensive and can be easily transported to a location remote from the server. Moving the tape to a remote location ensures that the tape would survive an earthquake or fire that might otherwise damage data on the server. However, reading and writing data to tape is a relatively slow process, compared to data transfers to and from a hard drive, for example. Still, the advantages of tape, including its cost and its ability to be moved freely, continue to make tape an important part of an overall backup strategy.

More recently, systems have been suggested that use a backup server to backup data to disk (e.g. RAID storage), instead of tape. However, in a typical backup server to disk system, the application server must wait in line for access to the backup server. Moreover, once the application server accesses the backup server, the data must pass through the backup server to be written to the backup disk. In addition to these time delays, the backup server to disk system fails to leverage the advantages offered by tape backup described above. A more desirable backup system would allow an application server to write its backup data directly to a block storage device (without waiting in line for a backup server), followed by a secondary backup to tape, for long term data storage.

Another application in which the sharing of block level data over a network is particularly useful is the editing of a large block of data by a plurality of users that are working, for example, on personal computers or workstations at different locations. For example, a shareable block device could be used to sequentially allow a first edit session with a worker at a first location followed by a second edit session with a worker at a second location, without requiring the block of data to be transferred from the first location to the second. The ability to share block level data over a network can also be used to transfer ownership of block level data between a file server and a primary site. In one specific application, the block level device can be configured to transfer ownership from a file server to a primary site at a pre-selected time.

In light of the above, it is an object of the present invention to provide systems and methods for sharing block data over a network. It is another object of the present invention to provide an appliance that allows a backup server and an application server to access and share a block level storage device for the purpose of backing up data from the application server. It is yet another object of the present invention to provide systems and methods for providing a plurality of networked computers shared access to a block level storage device that does not require customized software or hardware to be installed on the accessing computers. Yet another object of the present invention is to provide an appliance that is capable of performing a quick data backup from a standard application server that includes both a primary backup on a hard drive and a secondary backup to tape. It is still another object of the present invention to provide systems and methods for sharing block data over a network which are easy to use, relatively simple to implement, and comparatively cost effective.

SUMMARY OF THE INVENTION

The present invention is directed to a system for sharing block data over a network. In one application of the system, block data from a first computer (e.g. an application server) is first transferred over a network to a non-removable storage device (e.g. hard drive) and stored there. With the block data stored on the storage device, a second computer (e.g. backup server) then accesses the storage device, reads the stored block data and then writes the block data to tape. The result is a relatively quick backup of the application server's hard drive to both a primary backup hard drive and a secondary backup tape.

In greater detail, the system includes a non-removable device for storing block data (e.g. a hard drive) that is connected over a network to a plurality of computers, that can include but are not limited to application servers and backup servers. Each computer can initiate discovery commands, transfer data with removable block devices via read/write commands and transfer data with non-removable block devices via read/write commands. These commands can then be transmitted over the network to the non-removable storage device.

Before reaching the non-removable block storage device, commands from the computers are intercepted and processed by a logical algorithm program. For example, if the commands are transmitted in iSCSI format (i.e. the computers are equipped with iSCSI initiator software) the logical algorithm program can be embedded in the iSCSI target software at the non-removable block storage device.

The functionality of the logical algorithm program is twofold. First, the logical algorithm program functions to instruct each computer to treat the non-removable block storage device as a removable block device. In simpler terms, the logical algorithm program instructs each computer to treat the non-removable block storage device, which is typically a hard drive, in the same way that the computer treats a floppy drive (which is a removable block device).

In addition to identifying the block storage device as a removable block device, the logical algorithm program also functions to allocate temporary ownership of the block storage device to one of the computers on the network. Also, the logical algorithm program allows temporary ownership of the block storage device to pass from one computer on the network to another computer on the network (e.g. allows an ownership transfer from the application server to the backup server). While a computer owns the block storage device, the logical algorithm program allows the owning computer's read/write commands to be processed by the block storage device.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
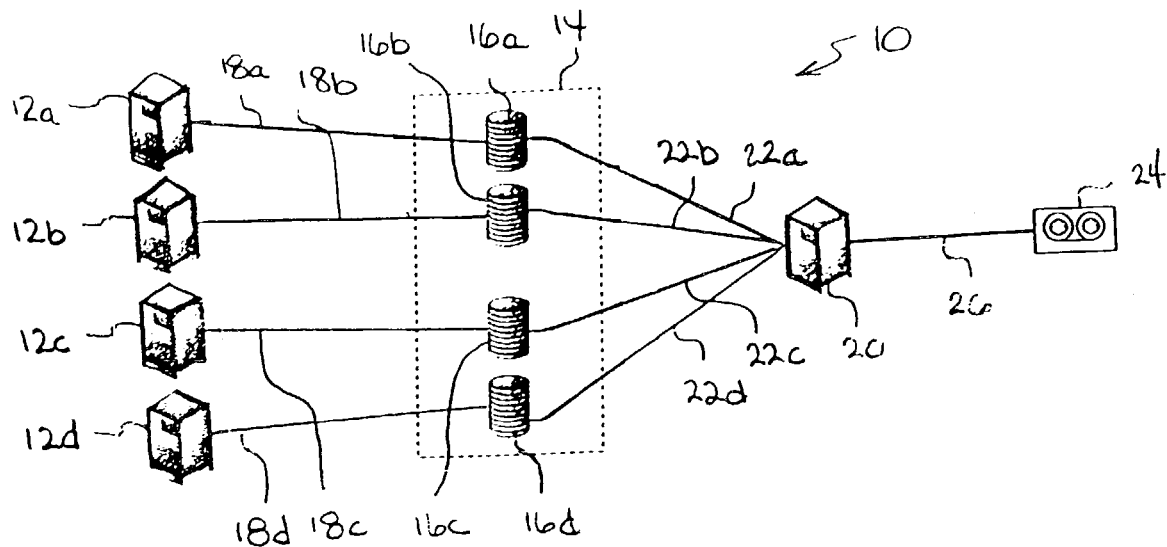
FIG. 1 is a simplified schematic of a network arrangement for providing dataset backup (and restores) from an application server on a primary backup hard drive and a secondary backup tape.

Referring to FIG. 1, a system for sharing block data over a network is shown and generally designated 10. For the embodiment shown in FIG. 1, the system 10 includes four application servers 12*a-d*. It can be further seen that the system 10 includes an appliance 14 that includes four non-removable block storage devices, which in this case are hard drives 16*a-d*. It can be further seen that the servers 12*a-d* are connected to the hard drives 16*a-d* via respective links 18*a-d*.

FIG. 1 also shows that a backup server 20 is connected to each hard drive 16*a-d* via respective links 22*a-d*. In addition, the backup server 20 is connected to a tape device 24 via link 26. In functional overview, the system 10 allows one of the application servers 12 to access one of the hard drives 16 and write block level data directly to the hard drive 16. The application server 12 then relinquishes control of the hard drive 16. With the block data stored on the hard drive 16, the backup server 20 then accesses the hard drive 16 and reads the stored block data. Next, the backup server 20 relinquishes control of the hard drive 16 and writes the block data to tape using the tape device 24. The result is a relatively quick backup of the application server data to both a primary backup hard drive 16 and a secondary backup tape.

Each server 12, 20 can initiate I/O commands for transmission over the links 18, 22 which can be, for example, gigabit Ethernet networks. Typically, each server 12, 20 can initiate I/O commands, such as read/write commands, for interaction with non-removable block devices, such as the hard drives 16 and removable block devices such as a local floppy drive. Further, each server 12, 20 can initiate and transmit discovery commands to determine whether a particular block device is a removable or non-removable device.

Figure 2:
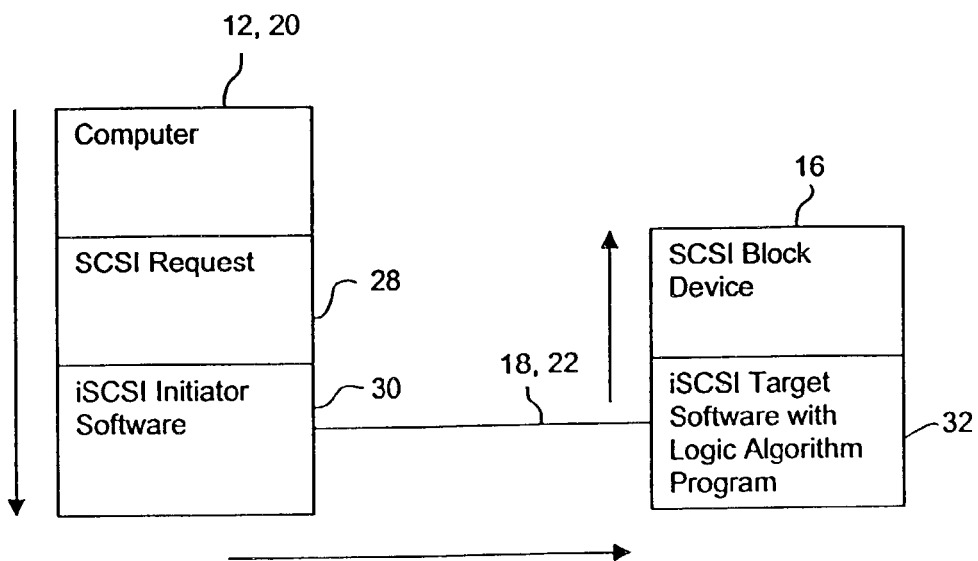
FIG. 2 is a block flow diagram which illustrates a typical dialogue between a server and a block storage device.

FIG. 2 illustrates a typical iSCSI dialogue between a server 12, 20 and a hard drive 16. Although the iSCSI protocol is used in FIG. 2 to facilitate discussion, those skilled in the pertinent art will appreciate that other protocols, including but not limited to the Fibre Channel protocol, could be used in the system 10. As shown in FIG. 2, the server 12, 20 initiates a SCSI request 28 that is programmed into an iSCSI request using iSCSI initiator software 30 located on the server 12, 20. The iSCSI request is then forwarded over the network via link 18, 22 to the SCSI block device (i.e. hard drive 16). As shown, the iSCSI request is intercepted by iSCSI target software 32 that includes software code for performing a specialized logic algorithm. As shown, the iSCSI target software 32 is positioned to receive the iSCSI request before it reaches the SCSI block device (i.e. hard drive 16).

Figure 3:
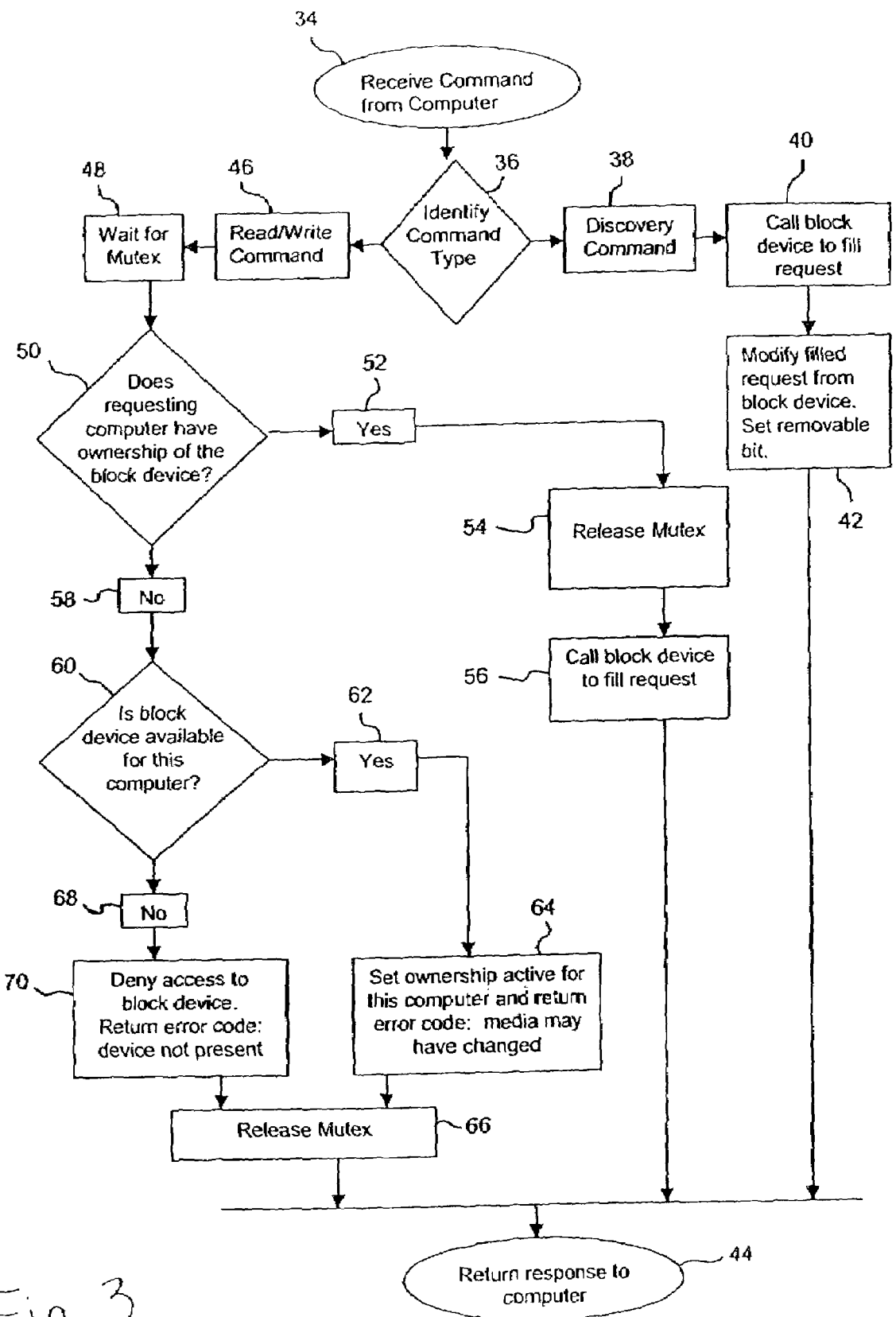
FIG. 3 is a logic flow diagram suitable for use in a system for sharing block level data.

The functionality of the logical algorithm program can best be appreciated with reference to FIG. 3. First, as shown by terminal block 34, a command (e.g. an iSCSI request) is first received from a computer (e.g. server 12, 20). Next, the type of command is identified (decision block 36). For the case where the command is a discovery command (block 38) the block device (e.g. hard drive 16) is called to fill the request (block 40). Next, the filled request is modified by the iSCSI target software 32 to set the removable bit (block 42). Terminal block 44 shows that the modified, filled request is then sent back to the computer (e.g. server 12, 20). This sequence of steps functions to instruct the computer (e.g. server 12, 20) to treat the non-removable block storage device (e.g. hard drive 16) as a removable block device. Subsequently, the computer (e.g. server 12, 20) initiates and transmits read/write commands for processing by the iSCSI target software 32 and non-removable block storage device (e.g. hard drive 16).

The logical algorithm program also functions to allocate temporary ownership of the block storage device (e.g. hard drive 16) to one of the computers (e.g. server 12, 20) on the network. Additionally, the logical algorithm program allows temporary ownership of the block storage device (e.g. hard drive 16) to pass from one computer (e.g. server 12, 20) on the network to another computer (e.g. server 12, 20) on the network. For example, the logical algorithm program allows an ownership transfer from an application server 12 to the backup server 20. While a computer (e.g. server 12, 20) owns the block storage device (e.g. hard drive 16), the logical algorithm program allows the owning computer's read/write commands to be processed by the block storage device.

Access to the block storage device is governed by the iSCSI target software 32. Access to the block storage device is one-at-a-time and the following device states are defined: a free state, an active state and a sleep state. In the free state, no computer owns the block device. If a computer requests ownership of the device, ownership will be granted. In the active state, a computer has been granted (and has not relinquished) ownership of the device. Once a computer has ownership of the block device, it must continue to use the device to retain ownership. If a computer does not access the block device for a predetermined amount of time, the ownership state of the device is changed from the active state to the sleep state. Because the computer is treating the non-removable block device as a removable device, clean data blocks are completely transferred before the device is placed in the sleep state. With the block device in the sleep state, ownership will be granted to another computer if requested. However, the first message returned to the new computer will be an error message alerting the new computer that the media may have changed. On the other hand, if the computer that put the device into the sleep state requests ownership, ownership will be granted and no error message will be returned.

Access to the block storage device can best be understood with reference to FIG. 3. As shown there, read/write commands from computers (e.g. servers 12, 20) are first received (terminal block 34) and the type of command is identified (decision block 36). Once identified as read/write commands (block 46), the next step is to wait for Mutex (block 48). Next, the program checks to see if the requesting computer has ownership of the block device or has placed the device into the sleep state (decision block 50). If it does have ownership (block 52) the program releases Mutex (block 54), calls the block device (e.g. hard drive 16) to fill the request (block 56) and forwards the filled request to the computer (terminal block 44).

Continuing with FIG. 3, if the result of decision block 50 is that the requesting computer does not have ownership of the block device (block 58) then the program checks to see if the block device is available (decision block 60). The block device is available if another computer placed it in the sleep state or if it is in the free state. If the block device is available (block 62) then the program sets ownership active for the requesting computer and prepares a return error code alerting the computer that the media may have changed (block 64). Next, the program releases Mutex (block 66) and returns the error code to the computer (terminal block 44).

On the other hand, if the result of decision block 60 is that the block device is not available (block 68) then the program denies access to the requesting computer and prepares a return error code indicating that the device is not present (block 70). Next, the program releases Mutex (block 66) and returns the error code to the computer (terminal block 44).

While the particular system and method for selectively transferring block data over a network as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for sharing block data over a network, said system comprising:

an appliance comprising one or more non-removable media devices for storing the block data;

a plurality of computers separate from said appliance, said plurality of computers comprising at least one application server and at least one backup server, each computer having respective means for initiating discovery commands, transferring data with devices utilizing removable block media and transferring data with devices utilizing non-removable block media;

means associated with said one or more non-removable media devices for receiving discovery commands from multiple ones of said computers and generating responses thereto, said responses identifying a non-removable media device in said appliance utilizing non-removable media as a removable media device; and means for processing removable block media data transfers with a non-removable media device in said appliance to transfer block data stored on said at least one application server to said appliance, wherein said at least one application server acts as owner of said non-removable media devices during said transfer, and to transfer said block data stored on said appliance to said at least one backup server, wherein said at least one backup server acts as owner of said non-removable media device during said transfer;

wherein said at least one backup server comprises a means for writing data received from said appliance to tape.

2. A system as recited in claim 1 wherein said device utilizing non-removable block media is a hard drive.

3. A system as recited in claim 1 wherein said device comprising non-removable media is a RAID.

4. A system as recited in claim 1 wherein said discovery commands are iSCSI protocol commands.

5. A system as recited in claim 1 wherein said discovery commands are Fibre Channel protocol commands.

6. A system as recited in claim 1 wherein said processing means uses a Mutex program object.

7. A method for sharing block level data over a network, said method comprising the steps of:

connecting an appliance comprising one or more non-removable media devices for storing the block level data to a plurality of computers separate from said appliance, said plurality of computers comprising at least one application server and at least one backup server, each computer having respective means for initiating discovery commands, transferring data with removable media devices and transferring data with non-removable media devices;

receiving discovery commands at said one or more non-removable media devices from multiple ones of said computers and generating responses thereto, said responses identifying a non-removable media device in said appliance as a removable media device;

receiving removable block media read/write commands at said one or more non-removable media devices from said at least one application server and said least one backup server; and writing a backup set from said at least one application server to a non-removable media device, wherein the at least one application server takes control, over the network, of said non-removable media device during the writing, and relinquishes control, over the network, upon completion of the writing;

reading said backup set by said at least one backup server and writing said backup set to tape, wherein the at least one backup server takes control, over the network, of said non-removable media device during the reading.

8. A method as recited in claim 7 wherein said non-removable media device is selected from a hard drive and a RAID.

9. A method as recited in claim 7 wherein said discovery commands are formatted in a protocol selected from the group of protocols consisting of Fibre Channel and iSCSI.

10. A method as recited in claim 7 wherein said connecting step is accomplished using an Ethernet network.

* * * * *

UNITED STATES PATENT AND TRADEMARK OFFICE
CERTIFICATE OF CORRECTION

| | |
|---|---|
| PATENT NO. | : 7,613,784 B2 |
| APPLICATION NO. | : 10/444680 |
| DATED | : November 3, 2009 |
| INVENTOR(S) | : Matze et al. |

It is certified that error appears in the above-identified patent and that said Letters Patent is hereby corrected as shown below:

Column 6, line 17-18, in Claim 1, after "appliance" delete "utilizing non-removable media".

Column 6, line 24, in Claim 1, change "devices" to -- device --.

Column 6, line 60, in Claim 7, change "said least" to -- said at least --.

Column 6, line 61, in Claim 7, after "server;" delete "and".

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,613,784 B2
APPLICATION NO. : 10/444680
DATED : November 3, 2009
INVENTOR(S) : Matze et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Nineteenth Day of October, 2010

David J. Kappos
*Director of the United States Patent and Trademark Office*